April 8, 1958 R. B. BOURNE ET AL 2,829,729
SILENCER FOR THE EXHAUST GASES OF AN
INTERNAL COMBUSTION ENGINE
Filed June 21, 1955 2 Sheets-Sheet 1
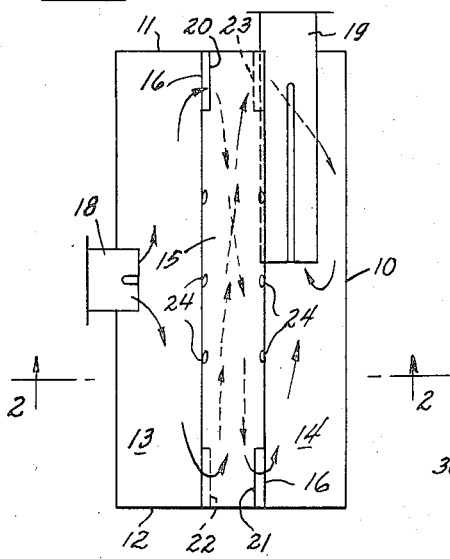
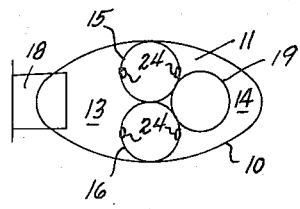
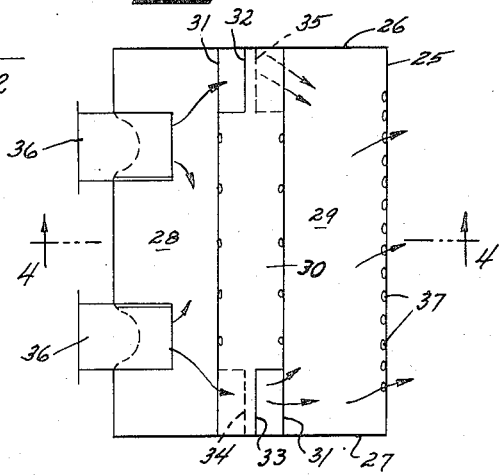
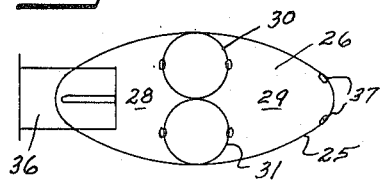
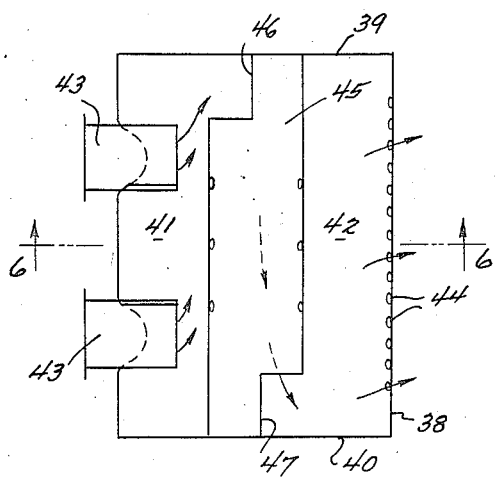
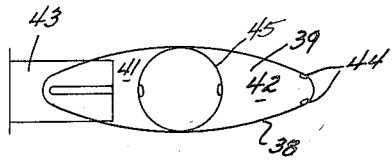
INVENTORS
ROLAND B. BOURNE
JOHN P. TYSKEWICZ
BY
Teller + McCormick
ATTORNEYS April 8, 1958 R. B. BOURNE ET AL 2,829,729
SILENCER FOR THE EXHAUST GASES OF AN
INTERNAL COMBUSTION ENGINE
Filed June 21, 1955 2 Sheets-Sheet 2
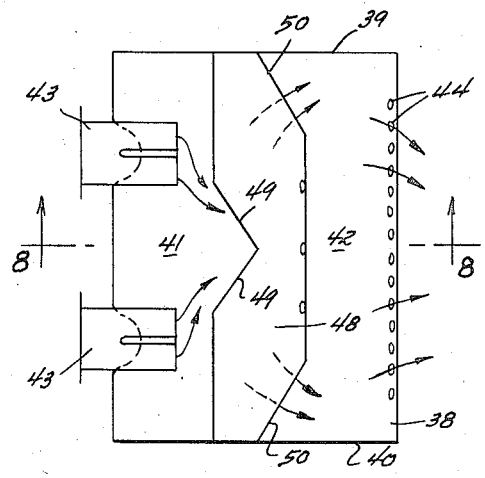
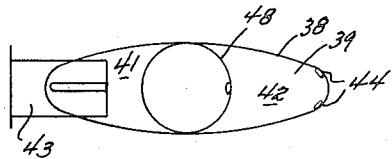
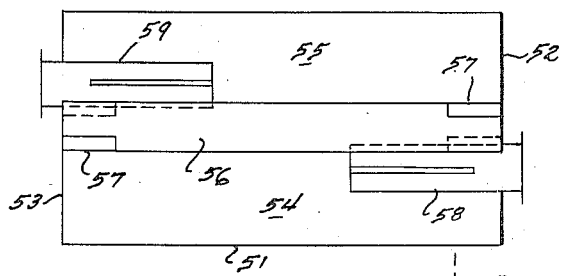
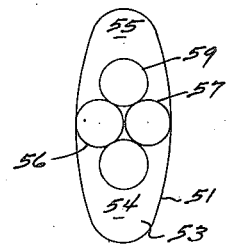
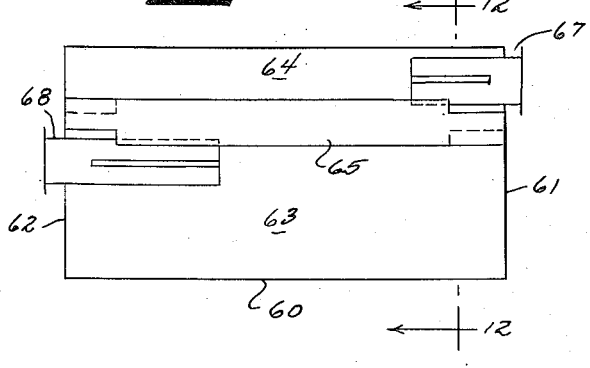
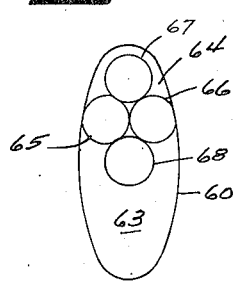
INVENTORS
ROLAND B. BOURNE
JOHN P. TYSKEWICZ
BY
Teller + McCormick
ATTORNEYS United States Patent Office 2,829,729
Patented Apr. 8, 1958

2,829,729

SILENCER FOR THE EXHAUST GASES OF AN INTERNAL COMBUSTION ENGINE

Roland B. Bourne, West Hartford, and John P. Tyskewicz, Hartford, Conn., assignors to The Maxim Silencer Company, Hartford, Conn., a corporation of Connecticut Application June 21, 1955, Serial No. 516,888

8 Claims. (Cl. 181—57)

This invention relates to improvements in a heavy duty silencer for the exhaust gases of an internal combustion engine or the like.

It is the general object of the invention to provide a low back pressure silencer which is efficient in the acoustic treatment of an engine exhaust line and which is particularly characterized by its sturdy construction. In this connection, it is a specific object of the invention to provide a heavy duty silencer capable of holding its shape and structural integrity under the most adverse of anticipated conditions, as for example, when the temperature of the gas stream is so high as to materially weaken the structure of the conventional silencer so that it may be damaged by backfire.

Another specific object of the invention is to provide in a silencer construction, which includes a shell, a particularly strong partition comprising solely one or more gas conducting tubes which divide the interior of the shell into an inlet compartment and an outlet compartment.

Other objects and advantages of the invention will become apparent from the detailed description taken in connection with the attached drawings wherein, Fig. 1 is a schematic plan view of a silencer constructed in accordance with the present invention, showing the interior of the silencer shell as it would appear with the upper portion thereof cut away;

Fig. 2 is a view taken as indicated by the line 2—2 of Fig. 1;

Fig. 3 is a view similar to Fig. 1 but showing an alternative form of construction;

Fig. 4 is a view taken as indicated by the line 4—4 of Fig. 3;

Fig. 5 is a view similar to Figs. 1 and 3 showing another alternative form of construction;

Fig. 6 is a view taken as indicated by the line 6—6 of Fig. 5;

Fig. 7 is a view similar to Figs. 1, 3 and 5 showing a third alternative in construction;

Fig. 8 is a view taken as indicated by the line 8—8 of Fig. 7;

Fig. 9 is another view similar to Fig. 1 showing an additional alternative in construction;

Fig. 10 is a view taken as indicated by the line 10—10 of Fig. 9;

Fig. 11 is a view similar to Fig. 9 showing a fifth alternative form of construction; and Fig. 12 is a view taken as indicated by the line 12—12 of Fig. 11.

The invention may be described generally and with reference to all of the forms shown as comprising a silencer which includes a shell closed by a pair of end headers to define a silencer casing and wherein at least one tube extends between the end headers and forms a principal support structure for the casing and also divides the interior thereof into two chambers. The shell or casing may be of any convenient shape or configuration adaptable to the particular installation but is preferably elliptical. One of the chambers or compartments defined within the shell by the partition-forming tube or tubes comprises an inlet chamber and the other comprises an outlet chamber. The inlet chamber may be connected by suitable conduit means to the exhaust of an internal combustion engine or to any other conduit which carries a gas stream wherein sound is to be attenuated. The outlet chamber is provided with a conduit or other gas passage means adapted to discharge the gas stream from the silencer shell. The partition-forming tube or tubes have openings arranged in a novel fashion and respectively communicating with the inlet chamber and with the outlet chamber so as to transfer the gas stream from one to the other and the said tube or tubes are particularly adapted to attenuate sound in the gas stream which it carries.

The first silencer embodiment incorporating the features of the present invention is shown in Figs. 1 and 2 and includes a shell 10 which is closed by a pair of end headers 11 and 12. The shell 10 is shown to be elliptical, but it may be of any other desirable configuration. An elliptical shell is preferred in most instances because it saves space in the installation of the silencer. The interior of the shell is divided into two chambers 13 and 14 by a pair of superposed tubes 15 and 16 which extend between the end headers 11 and 12. The term "superposed" is used herein in a generic sense and is intended to refer to a parallel relationship of the partition tubes which may vary from a connection in a vertical plane to a connection in a horizontal plane. The tubes 15 and 16 are welded or otherwise rigidly connected together in substantially parallel relationship and the said tubes are welded or otherwise rigidly connected with the top and bottom, respectively, of the shell 10 whereby the tubes provide a longitudinal partition within the said shell. Obviously, the rigidly connected circular tubes provide a very sturdy support structure for the silencer and under the most adverse of anticipated conditions will maintain the structural shape and integrity of the shell.

One or the other of the compartments 13 and 14 comprises an inlet chamber for a gas stream and the other compartment comprises an outlet chamber for the said gas stream. In the particular manner of showing the embodiment in Figs. 1 and 2, the chamber 13 is designated as the inlet chamber and a conduit 18 extends from the said chamber 13 through the wall of the shell 10 for connection with a gas carrying conduit such as the exhaust pipe of an internal combustion engine. Another conduit 19 is shown extending into the chamber 14 for discharging the gas stream therefrom. In the specific example shown, the inlet conduit 18 extends through the side of the shell 10 and the discharge conduit 19 extends through the end header 11, but it should be understood that various other dispositions of the inlet and outlet conduits can be made without departing from the scope and spirit of the present invention.

The relatively long partition-forming tubes 15 and 16 carry the gas stream from the inlet chamber 13 to the outlet chamber 14. It has been found to be acoustically advantageous to provide side openings for the tubes 15 and 16 adjacent the opposite ends, the said openings being located on opposite sides of the tubes. More specifically, the tube 15 has a side opening 20 adjacent the end header 11 in communication with the chamber 13 and a side opening 21 adjacent the end header 12 and in communication with the chamber 14. The tube 16 has a side opening 22 adjacent the end header 12 in communication with the chamber 13 and a side opening 23 adjacent the end header 11 and in communication with the chamber 14. Accordingly, the sound carrying gas stream entering the chamber 13 through the conduit 18 flows as indicated by the arrows through both of the tubes 15 and 16 into the outlet compartment of the chamber 14 and is then discharged through the conduit 19. In flowing through the tubes 15 and 16 from the chamber 13 to the chamber 13 through the opening 20 at one end of the chamber 14, part of the gas enters the tube 15 from the shell and most of the rest of the gas enters the tube 16 through the opening 22 in the other end of the shell. There is a certain amount of pulsating gas flow in and out of a plurality of apertures 24, 24 in the tubes 15 and 16. The said apertures are longitudinally spaced apart in accordance with known technique for anti-resonance. The pulsating flow in and out of the apertures 24, 24 greatly improves the low frequency attenuation of the silencer. Accordingly, it can be said that the tubes 15 and 16 not only provide an exceptionally strong partition and gas transfer conduits, they also provide sound attenuating elements in the silencer shell. To further enhance sound attenuation, the inlet conduit 18 and the outlet conduit 19 are provided with anti-resonance slots adjacent the ends of the said tubes within their respective chambers.

The silencer embodiment shown in Figs. 3 and 4 is generally similar to the first described embodiment but includes some alternative construction. That is, in the alternative form the silencer includes a shell 25 which is generally elliptical and which is closed by end headers 26 and 27. The interior of the shell is divided into an inlet compartment 28 and an outlet compartment 29 by a pair of tubes 30 and 31 which extend longitudinally of the shell between the end headers and which are similar to the first described partition tubes. The tube 30 has side openings 32 and 33 adjacent its opposite ends which respectively open into the inlet compartment 28 and the outlet compartment 29. The tube 31 has side openings 34 and 35 adjacent its opposite ends which respectively open into the inlet compartment 28 and the outlet compartment 29. In the particular form of silencer being described, the gas is admitted to the inlet compartment 28 through two conduits 36, 36 extending into the side of the shell 25, the said conduits being preferably equally spaced from the respective end headers. A further modification is achieved in discharging the gas stream from the outlet compartment 29 through a plurality of apertures 37, 37 which are preferably arranged in two longitudinally extending rows adjacent the side of the shell 25 opposite the side having the inlet conduits 36, 36.

This embodiment is particularly well suited for installation on an engine having two exhaust pipes and where it is not necessary to discharge the gases from the silencer through a conduit.

The silencer embodiment shown in Figs. 5 and 6 is also particularly adapted to installation on a multiple exhaust engine. That is, the silencer shell 38 shown in Figs. 5 and 6 is closed by end headers 39 and 40 and divided into a longitudinally extending inlet compartment 41 and a longitudinally extending outlet compartment 42, the exhaust gases being introduced to the inlet compartment through two spaced apart conduits 43, 43 similar to the conduits 36, 36. The gas is discharged from the silencer through a plurality of apertures 44, 44 arranged in rows similarly to the previously described apertures 37, 37. The embodiment of Figs. 5 and 6 is different from the last described embodiment in that the shell 38 is more flat and also in that the compartments 41 and 42 are defined within the shell by a single partition tube 45. The tube 45 is of greater diameter than any of the previously described partition tubes and is of sufficient size to carry the same volume of gas as would be carried by a pair of partition tubes in the previously described embodiments. In the single tube partition form shown, the gas is admitted to the tube through a side opening 46 adjacent the end header 39 and is discharged from the tube into the outlet compartment 42 through a side opening 47 adjacent the end header 40.

The silencer embodiment shown in Figs. 7 and 8 is quite similar to the embodiment shown in Figs. 5 and 6, the shell, end headers, and inlet conduits being identical and indicated by the same reference numerals. The only change effected in the embodiment of Figs. 7 and 8 is in the construction of a single tube partition designated by the reference numeral 48. In the tube 48, the gas is received from the inlet compartment 41 through a centrally located side opening defined by two slash or kerf cuts 49, 49. The gas is discharged into the outlet compartment 42 through two slash cut openings 50, 50 located adjacent the ends of the tube 48.

The silencer form shown in Figs. 9 and 10 is quite similar to the embodiment of Figs. 1 and 2 and comprises a shell 51 closed by end headers 52 and 53 and divided into two longitudinal compartments 54 and 55 by a pair of partition tubes 56 and 57 which extend between the end headers 52 and 53. The silencer of Figs. 9 and 10 is different from the silencer of Figs. 1 and 2 in that both the inlet and the outlet conduits extend through end headers. As shown in the drawings, the conduits 58 and 59 extend into the chambers 54 and 55 through the end headers 52 and 53, respectively, and are similarly arranged. Accordingly, the conduit 58 or the conduit 59 may be connected to the exhaust pipe of the engine and the other of said conduits will then comprise the discharge conduit. If the conduit 58 is connected to an exhaust pipe so as to receive the gas stream, the compartment 54 will comprise the inlet compartment or chamber and the compartment 55 will comprise the outlet compartment or chamber. The gas in passing from the chamber 54 to the chamber 55 through the tubes 56 and 57 will enter the said tubes at opposite ends through the openings shown and flow in opposite directions within the respective tubes.

The silencer embodiment of Figs. 11 and 12 is generally similar to the embodiment shown in Figs. 9 and 10 and comprises an elliptical shell 60 closed by end headers 61 and 62 and divided into chambers 63 and 64 by partition tubes 65 and 66 which extend between said end headers. Similarly to the embodiments of Figs. 9 and 10, the silencer has a pair of conduits 67 and 68 extending through the opposite end headers 61 and 62 into the chambers 64 and 63, respectively. It is important to observe that in the silencer form of Figs. 11 and 12 the partition-forming tubes 65 and 66 are spaced from but extend substantially parallel to the longitudinal plane containing the minor axis of the shell's cross-sectional ellipse. Thus, one chamber, the chamber 63, is of greater crosssectional area and volume than the chamber 64. Either of the conduits 67 and 68 may comprise the inlet and the other the outlet for the silencer.

While the invention has been described with reference to a plurality of specific embodiments, it should be understood that various other forms and embodiments may be constructed in accordance with the invention and without departing from the scope and spirit thereof. Therefore, it is not the intent to limit the invention to the specific forms shown otherwise than indicated by the claims which follow.

The invention claimed is:

1. A silencer comprising in combination, a shell, a pair of headers closing the ends of the shell, at least one tube extending between the said end headers so that its ends are closed thereby, the said tube being welded to the shell to provide a partition dividing the interior of the shell into two longitudinally extending chambers, one on each side of the tube, and one of which comprises an inlet chamber and the other of which comprises an outlet chamber, the said tube having an opening in one side in communication with the inlet chamber and having an opening on the other side in communication with the outlet chamber, the said tube openings being spaced apart along the tube to transfer gas through the tube from the inlet chamber to the outlet chamber, inlet gas passage means opening into the inlet chamber, and discharge gas passage means opening into the outlet chamber.

2. A silencer comprising in combination, a shell, a pair of headers closing the ends of the shell, at least one tube extending generally longitudinally of the shell with its ends closed by the said headers, the said tube being welded to the shell to provide a partition dividing the interior of the shell into two longitudinally extending chambers on opposite sides of the tube, one of which comprises an inlet chamber and the other of which comprises an outlet chamber, the said tube having a pair of openings which are spaced apart along the tube and which respectively communicate with the inlet chamber and the outlet chamber, the said tube also having a plurality of longitudinally spaced apart relatively small anti-resonance apertures whereby the said tube will transfer gas from the inlet chamber to the outlet chamber and attenuate sound in the gas stream, inlet gas passage means opening into the inlet chamber, and discharge gas passage means opening into said outlet chamber.

3. A silencer comprising in combination, a generally elliptical sheet metal shell, a pair of headers closing the ends of the shell, at least one tube welded to the shell and to the end headers so that, its ends are closed thereby and extending between the end headers substantially parallel to the longitudinal plane containing the minor axis of the cross-sectional ellipse of the shell, the said tube dividing the interior of the shell into two chambers, one on each side of the tube, and one of which comprises an inlet chamber and the other of which comprises an outlet chamber, the said tube having at least two openings which are longitudinally spaced apart and which respectively communicate with the inlet chamber and with the outlet chamber whereby the tube will transfer gas from the inlet chamber to the outlet chamber, inlet gas passage means opening into the inlet chamber, and discharge gas passage means opening into the outlet chamber.

4. A silencer for the exhaust gases of an internal combustion engine or the like and comprising in combination, a generally elliptical shell, a pair of headers closing the ends of the shell, at least one tube welded to the shell and to the end headers so that its ends are closed thereby and extending between the said end headers to provide a partition dividing the interior of the shell into two chambers, one on each side of the tube, and one of which comprises an inlet chamber and the other of which comprises an outlet chamber, the said tube having an opening on one side in communication with the inlet chamber and having a spaced apart opening on the other side in communication with the outlet chamber whereby gas is transferred through the tube from the inlet chamber to the outlet chamber, an inlet conduit opening into the inlet chamber, and discharge gas passage means opening into said outlet chamber.

5. A silencer comprising in combination, a generally elliptical shell, a pair of headers closing the ends of the shell, a pair of superposed tubes rigidly connected together in parallel relationship and extending between said end headers so that their ends are closed thereby and welded to the shell to provide a partition substantially parallel to the longitudinal plane of the shell containing the minor axis of the cross-sectional ellipse, the said partition dividing the interior of the shell into two chambers, one on each side of the superposed tubes, and one of which comprises an inlet chamber and the other of which comprises an outlet chamber, each of said tubes having an opening on one side in communication with the inlet chamber and also having an opening on the other side in communication with the outlet chamber, the tube openings in communication with the inlet chamber being longitudinally spaced apart and the tube openings in communication with the outlet chamber being longitudinally spaced apart to transfer gas from the inlet chamber to the outlet chamber through both of the said tubes, inlet gas passage means opening into the inlet chamber, and discharge gas passage means opening into the outlet chamber.

6. A silencer for the exhaust gases of an internal combustion engine or the like and comprising in combination, a generally elliptical shell, a pair of headers closing the ends of the shell, a pair of superposed tubes rigidly connected together in substantially parallel relationship and welded to the shell substantially in the longitudinal plane therethrough containing the minor axis of the cross-sectional ellipse, the said tubes extending from one end header to the other so that their ends are closed thereby and dividing the interior of the shell into two chambers, one on each side of the superposed tubes, and one of which comprises an inlet chamber and the other of which comprises an outlet chamber, each tube having a side opening into the inlet chamber and a side opening into the outlet chamber, the openings into the inlet chamber being located adjacent opposite end headers and the openings into the outlet chamber being located adjacent opposite end headers whereby gas will pass through the tubes in opposite directions from the inlet chamber to the outlet chamber, an inlet conduit extending through the side of the shell and opening into the inlet chamber, and an outlet conduit extending through one end header and opening into the outlet chamber.

7. In a silencer casing comprising a shell and headers closing the ends of the shell, partition means positioned within said casing and extending from one end header to the other whereby are formed at least two compartments each of which is external of the partition means, said partition means comprising solely at least one gas and sound conducting conduit directly and continuously affixed to the wall of the shell and to said end headers and having a gas inlet opening on one side communicating with one compartment and an outlet opening on the other side communicating with the other compartment, the said openings being spaced apart along the conduit.

8. In a silencer casing comprising a shell and headers closing the ends of the shell, partition means positioned within said casing and extending from one end header to the other whereby are formed two compartments each of which is external of the partition means, said partition means comprising solely at least one gas and sound conducting conduit directly and continuously affixed to the wall of the shell and to said end headers and having a gas inlet opening on one side communicating with one compartment and an outlet opening on the other side spaced along the conduit from the inlet opening and communicating with the other compartment, and the said conduit also having at least one de-resonating aperture communicating with one compartment and at least one de-resonating aperture communicating with the other compartment.

References Cited in the file of this patent
UNITED STATES PATENTS

| | | |
|---|---|---|
| 713,536 | Tobias et al. | Nov. 11, 1902 |
| 990,686 | Troike | Apr. 25, 1911 |
| 2,018,084 | Oldberg | Oct. 22, 1935 |
| 2,034,186 | Heath | Mar. 17, 1936 |
| 2,537,203 | Bourne et al. | Jan. 9, 1951 |

U. S. DEPARTMENT OF COMMERCE
PATENT OFFICE

CERTIFICATE OF CORRECTION

Patent No. 2,829,729 April 8, 1958

Roland B. Bourne et al.

It is hereby certified that error appears in the printed specification of the above numbered patent requiring correction and that the said Letters Patent should read as corrected below.

Column 3, line 4, strike out "the chamber 13 through the opening 20 at one end of", and insert the same after "from" in line 5, same column.

Signed and sealed this 20th day of May 1958.

(SEAL)

Attest:
KARL H. AXLINE

Attesting Officer

ROBERT C. WATSON
Commissioner of Patents